Patented July 9, 1935

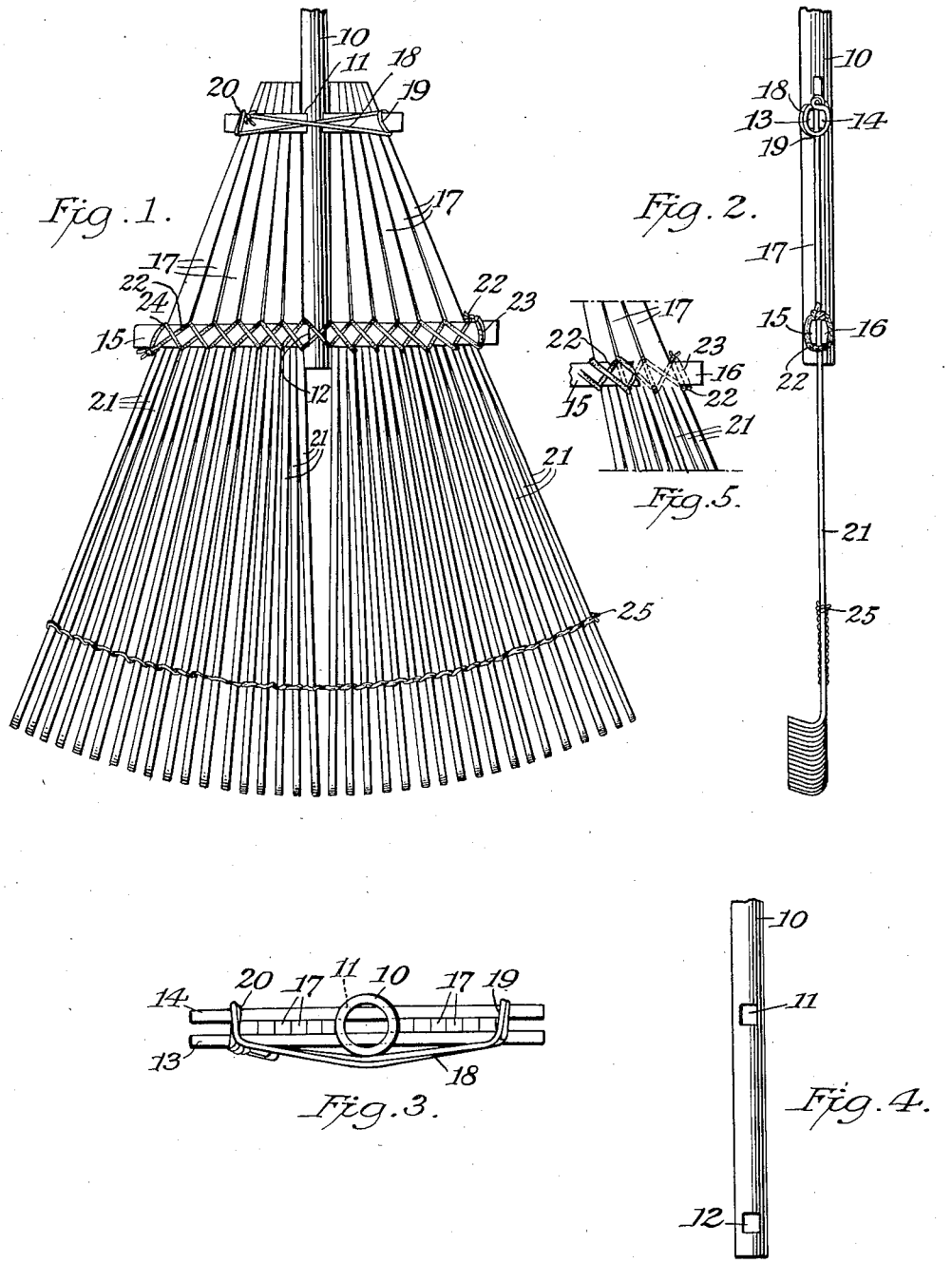

2,007,609

UNITED STATES PATENT OFFICE 2,007,609

RAKE

George H. Maus, Amsterdam, N. Y., assignor to Geo. H. Maus, Inc., Amsterdam, N. Y., a corporation of New York Application December 17, 1934, Serial No. 757,949

3 Claims. (Cl. 55—114)

This invention relates to rakes and like garden implements, and an object of the invention is to provide a rake having a handle with novel means for attaching the head of the rake to the handle.

A further object of the invention is to provide a rake comprising strips of wood, such as bamboo, which strips are relatively wide between their ends and in which the outer portions of the strips are split to form tines, whereas the inner ends of the strips are tapered in width in order that the inner end of the head will be relatively narrow.

It is furthermore an object of the invention to provide novel means for anchoring the strips so that a rigid head structure of the rake will ensue, the said structure proving strong and durable.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a plan view of a rake embodying the invention;

Figure 2 illustrates a side elevation thereof;

Figure 3 illustrates a view in elevation of the inner end of the rake;

Figure 4 illustrates a detail view of the inner end of the rake handle; and

Figure 5 illustrates a detail view of three of the strips and parts associated therewith.

In this drawing 10 denotes the handle which is preferably of wood and, in the present embodiment of the invention, the handle is hollow and is formed of bamboo of conventional type. The handle has two transversely disposed slots or openings 11 and 12. Clamping members 13 and 14 extend through the opening 11 and clamping members 15 and 16 extend through the opening 12, the said members 13, 14, 15 and 16 being arranged in pairs and being separable to permit the insertion of strips 17 which comprise bamboo or like flat material. The strips 17 are tapered toward their inner ends and have their edges preferably contacting one another in order that the width of the head may be minimized within such bounds as will not injuriously affect the strength of the structure.

The clamping members 13 and 14 with the interposed strips are secured by a lashing 18, which may comprise a wire tie or a thong, or such other flexible element as will serve the purpose of holding the strips nested between the clamping members 13 and 14. It is shown in the drawing that the tie embraces the clamping members as at 19 and 20 and the portions thereof which encircle the clamping members are in contact with the outer edges of the outer nested strips.

The strips 17 are each formed into a plurality of tines 21, and at approximately the junction of the main portion of each strip and its tines the said strips are interposed between the clamping members 15 and 16. The clamping members 15 and 16 are likewise secured in engagement with the strips 17 by lashings 22, which preferably comprise a thong-like vine or vegetable growth having tensile strength which will serve to withstand the strain when the lashings are laced around the clamping members and inserted between the strips for securing the clamping members in contact with the strips and tines. It is shown that the lashings 22 embrace the clamping members at 23 and 24 and that the loops thereof engage the outer edges of the outer strips and tines to prevent them from separating or moving laterally with respect to the head. The tines are also held in spaced relation to one another near their outer ends by a conventional fastening 25.

A rake embodying the invention is without metal elements unless the tie or lashing 18 comprises wire or the like, but otherwise the rake is formed of wood and is therefore of light weight, although durable and efficient.

It will be obvious that the lashing 22 may be threaded between the strips or the tines at approximately the junction of the strips and tines.

I claim:

1. In a rake, a handle having transversely disposed apertures, flat strips tapered at their inner ends, the said strips being in edge contact with one another, clamping members extending through one of the apertures of the handle, one of which engages the upper surfaces of the strips, the other of which engages the lower surfaces of the strips, a binding member encircling the clamping members at the outer edges of the outer strips and exerting pressure for holding the clamping members in engagement with the strips, tines formed as a part of each strip, means for holding the outer ends of the tines spaced, intermediate clamping members extending through the other aperture of the handle engaging the upper and lower surfaces of the strips at approximately the junction of the strips and tines, and a lashing threaded around the clamping members and through spaces between the said strips for exerting pressure on the clamping members to hold them in engagement with the strips.

2. In a rake, a handle having transversely disposed apertures, flat strips tapered at their inner ends, said strips being in edge contact with one another, clamping members extending through one of the apertures of the handle, one of which engages the upper surfaces of the strips and the other of which engages the lower surfaces of the strips, a member operative to bind the clamping members in engagement with the strips, tines formed as a part of each strip, means for holding the outer ends of the tines spaced, clamping members intermediate the length of the strips, one of which engages the upper surfaces of the strips, the other of which engages the lower surfaces of the strips, the last mentioned clamping members extending through the other aperture of the handle, and a lashing in engagement with the clamping members operative to bind said clamping member into engagement with the strips.

3. In a rake, a handle having transversely disposed apertures, flat strips tapered at their inner ends, said strips being in edge contact with one another, clamping members extending through one of the apertures of the handle, one of which engages the upper surfaces of the strips and the other of which engages the lower surfaces of the strips, a member operative to bind the clamping members in engagement with the strips, tines formed as a part of each strip, means for holding the outer ends of the tines spaced, clamping members intermediate the length of the strips, one of which engages the upper surfaces of the strips, the other of which engages the lower surfaces of the strips, the last mentioned clamping members extending through the other aperture of the handle, and a lashing embracing the clamping members at the outer edges of the outer strips, the said lashing being laced around the said clamping members and between certain of the said strips.

GEORGE H. MAUS.